United States Patent
Ogasahara

(10) Patent No.: US 8,497,925 B2
(45) Date of Patent: Jul. 30, 2013

(54) SOLID-STATE IMAGING DEVICE, COLOR FILTER ARRANGEMENT METHOD THEREFOR AND IMAGE RECORDING APPARATUS

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 13/047,119

(22) Filed: Mar. 14, 2011

(65) Prior Publication Data

US 2011/0234863 A1    Sep. 29, 2011

(30) Foreign Application Priority Data

Mar. 25, 2010  (JP) ................. 2010-069525

(51) Int. Cl.
*H04N 9/083*  (2006.01)
*H04N 3/14*  (2006.01)

(52) U.S. Cl.
USPC ........... 348/271; 348/280; 348/294; 257/431; 250/226

(58) Field of Classification Search
USPC .................. 348/270, 271, 272–280, 294
See application file for complete search history.

(56) References Cited

U.S. PATENT DOCUMENTS

| | | | | |
|---|---|---|---|---|
| 3,971,065 A | * | 7/1976 | Bayer | 348/276 |
| 5,956,086 A | * | 9/1999 | Sawanobori | 348/273 |
| 6,999,119 B1 | * | 2/2006 | Shibazaki et al. | 348/273 |
| 7,714,916 B2 | * | 5/2010 | Tatani | 348/273 |
| 7,745,779 B2 | * | 6/2010 | Conners | 250/226 |
| 8,330,839 B2 | * | 12/2012 | Compton et al. | 348/277 |
| 2006/0139469 A1 | * | 6/2006 | Yokota et al. | 348/272 |

OTHER PUBLICATIONS

U.S. Appl. No. 13/421,271, filed Mar. 15, 2012, Ogasahara.
U.S. Appl. No. 13/040,718, filed Mar. 4, 2011, Ogasahara.

* cited by examiner

*Primary Examiner* — Hung Lam
(74) *Attorney, Agent, or Firm* — Oblon, Spivak, McClelland, Maier & Neustadt, L.L.P.

(57) ABSTRACT

According to one embodiment, a solid-state imaging device having color pixels in which color filters are arranged for respective pixels, wherein in a color filter array in which two blocks of two pixels in a row direction×two pixels in a column direction of an X1 color are arranged on one diagonal line, and a block of two pixels in the row direction×two pixels in the column direction of an X2 color and a block of two pixels in the row direction×two pixels in the column direction of an X3 color are arranged on the other diagonal line, the pixels are shifted by one pixel in the column direction alternately in the row direction.

9 Claims, 4 Drawing Sheets

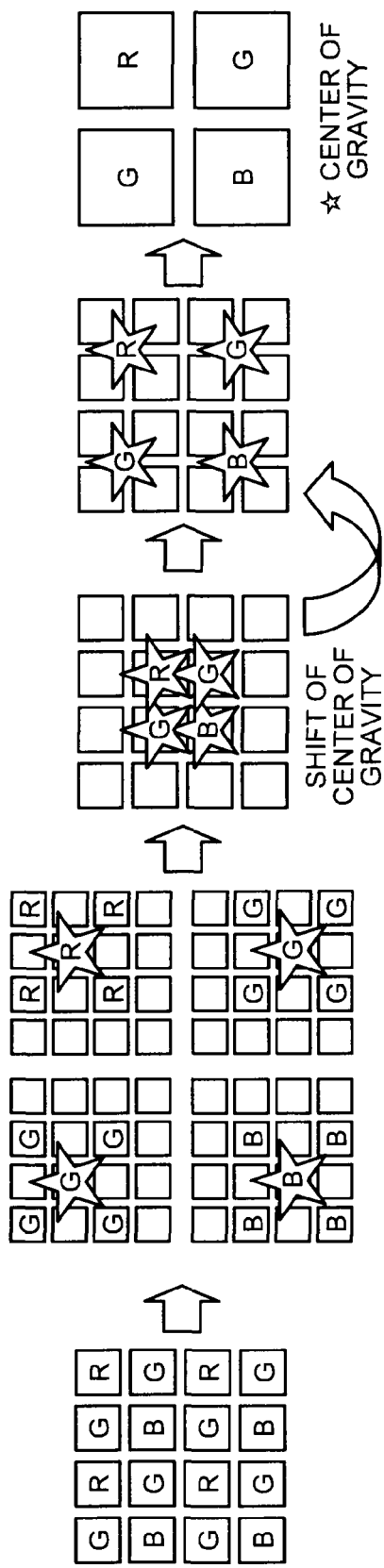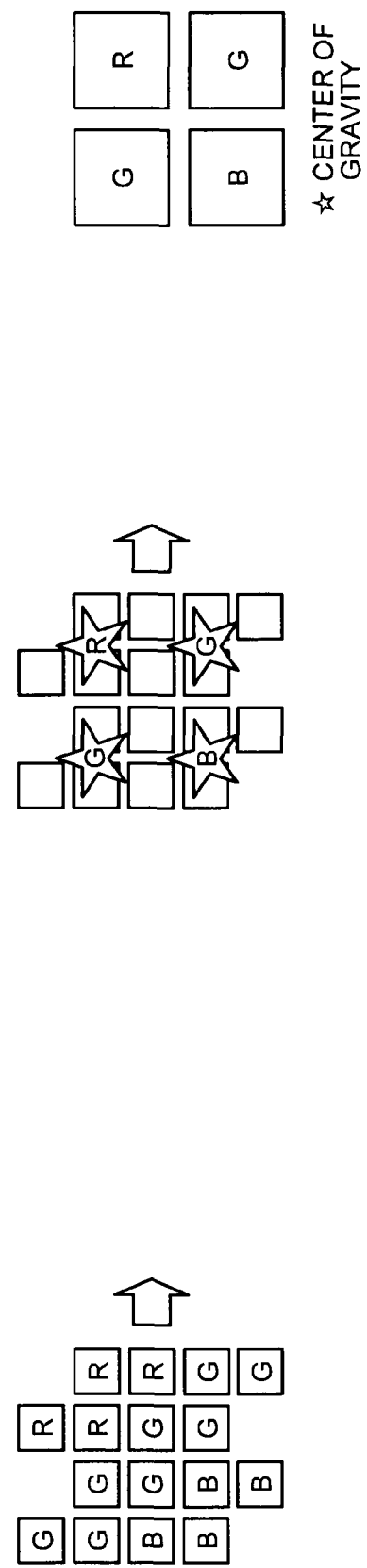

OVERLAP AREA

AREA OF NO OVERLAPPING

OVERLAP AREA

US 8,497,925 B2

SOLID-STATE IMAGING DEVICE, COLOR FILTER ARRANGEMENT METHOD THEREFOR AND IMAGE RECORDING APPARATUS

CROSS-REFERENCE TO RELATED APPLICATIONS

This application is based upon and claims the benefit of priority from Japanese Patent Application No. 2010-069525, filed on Mar. 25, 2010; the entire contents of which are incorporated herein by reference.

FIELD

Embodiments described herein relate generally to a solid-state imaging device, a color filter arrangement method therefor, and an image recording apparatus.

BACKGROUND

Solid-state imaging devices are widely used in various fields as elementary elements for performing image input processing. Currently, solid-state imaging devices which are in general use are roughly classified as either CCD image sensors or CMOS image sensors. The principle of a CMOS image sensor is to amplify output of a photodiode functioning as a photo detector provided for each individual pixel by a MOS transistor and obtain the amplified output. The CMOS image sensors as small solid-state imaging devices driven with low power consumption are regarded as promising. In such a solid-state imaging device, each pixel is being made finer and finer and the number of pixels is being increased.

In a solid-state imaging device, specific color filters for respective pixels such as color filters of R (red), G (green), and B (blue) are provided. The solid-state imaging device generally adopts a color filter array called the Bayer array (see, for example, U.S. Pat. No. 3,971,065).

However, if binning processing (pixel addition) is performed on the Bayer array in a situation in which sufficient sensitivity cannot be obtained from one pixel, line noise may be caused or the sensitivity or resolution maybe lowered.

BRIEF DESCRIPTION OF THE DRAWINGS

FIGS. 3A and 3B are diagrams illustrating binning processing on the Bayer array and the filter array of the present embodiment;

DETAILED DESCRIPTION

In general, according to one embodiment, in a solid-state imaging device having color pixels in which color filters are arranged for respective pixels, in a color filter array in which two blocks of two pixels in a row direction×two pixels in a column direction of an X1 color are arranged on one diagonal line and a block of two pixels in the row direction×two pixels in the column direction of an X2 color and a block of two pixels in the row direction×two pixels in the column direction of an X3 color are arranged on the other diagonal line, the pixels are shifted by one pixel in the column direction alternately in the row direction so that two pixels of the same color are arranged in the column direction and two pixels of the same color on adjacent rows arranged in the column direction are shifted by one pixel.

A solid-state imaging device according to the present embodiment, a color filter arrangement method therefor, and an image recording apparatus will be described in detail with reference to appended drawings. The present invention is not limited to the following embodiment.

Figure 1:
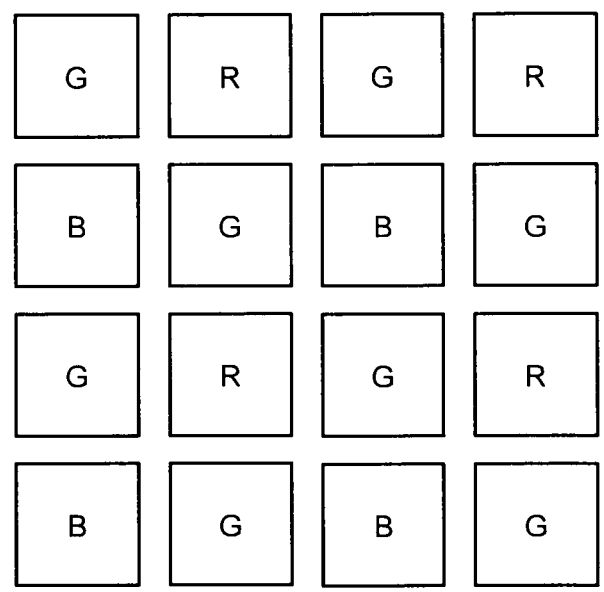
FIG. 1 is a diagram showing the Bayer array.
Figure 2:
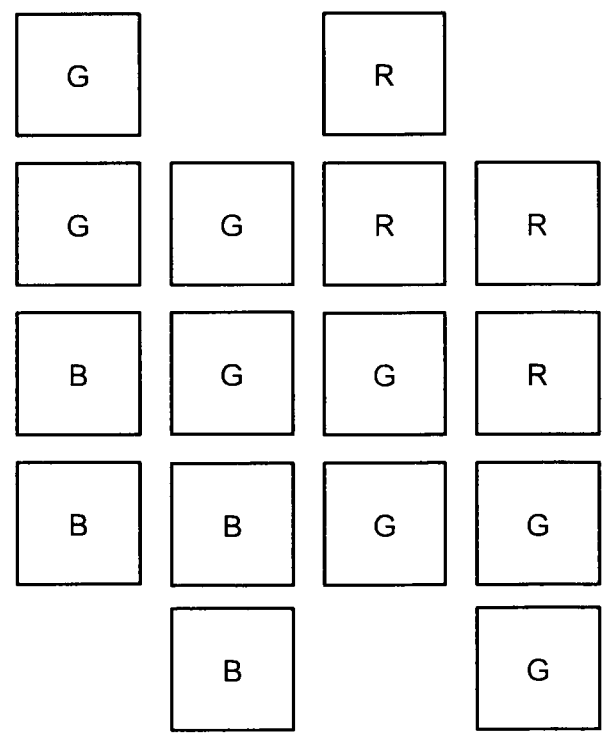
FIG. 2 is a diagram showing a color filter array of the present embodiment.

A color filter array (CFA) of a solid-state imaging device according to the present embodiment will be described with reference to FIGS. 1 to 4. The solid-state imaging device according to the present embodiment is a CMOS imaging device or a CCD imaging device. FIG. 1 is a diagram showing the Bayer array. FIG. 2 is a diagram showing a color filter array of the present embodiment.

As shown in FIG. 1, the Bayer array is a color filter array in which a basic block of two pixels in the row direction (horizontal direction)×two pixels in the column direction (vertical direction) is periodically arranged. In this basic block, two G (green) pixels are arranged on one diagonal line and an R (red) pixel and a B (blue) pixel are arranged on the other diagonal line.

As shown in FIG. 2, the filter array of the present embodiment is obtained by shifting pixels by one pixel in the column direction alternately in the row direction so that two pixels of the same color are arranged in the column direction and two pixels of the same color on adjacent rows arranged in the column direction are shifted by one pixel in a color filter array in which two blocks of two pixels in the row direction×two pixels in the column direction of G are arranged on one diagonal line and a block of two pixels in the row direction× two pixels in the column direction of R and a block of two pixels in the row direction×two pixels in the column direction of B are arranged on the other diagonal line.

FIGS. 3A and 3B are a diagram illustrating binning processing on the Bayer array and the filter array of the present embodiment, in which FIG. 3A shows a case of the Bayer array and FIG. 3B shows a case of the filter array of the present embodiment. When, for example, illuminance is low, processing to increase sensitivity is performed by adding four pixels of the same color.

In the Bayer array, the center of gravity is shifted when four pixels of the same color are added as shown in FIG. 3A. Thus, interpolation processing is needed after four pixels of the same color being added.

By contrast, in a color filter array of the present embodiment, the center of gravity does not change when four pixels of the same color are added as shown in FIG. 3B. Thus, interpolation processing after four pixels of the same color being added is not needed and processing of only addition of four pixels of the same color is sufficient. Accordingly, when four pixels of the same color are added, the color filter array of the present embodiment can obtain an image excellent in sensitivity and resolution as compared to the Bayer array.

Figure 4A:
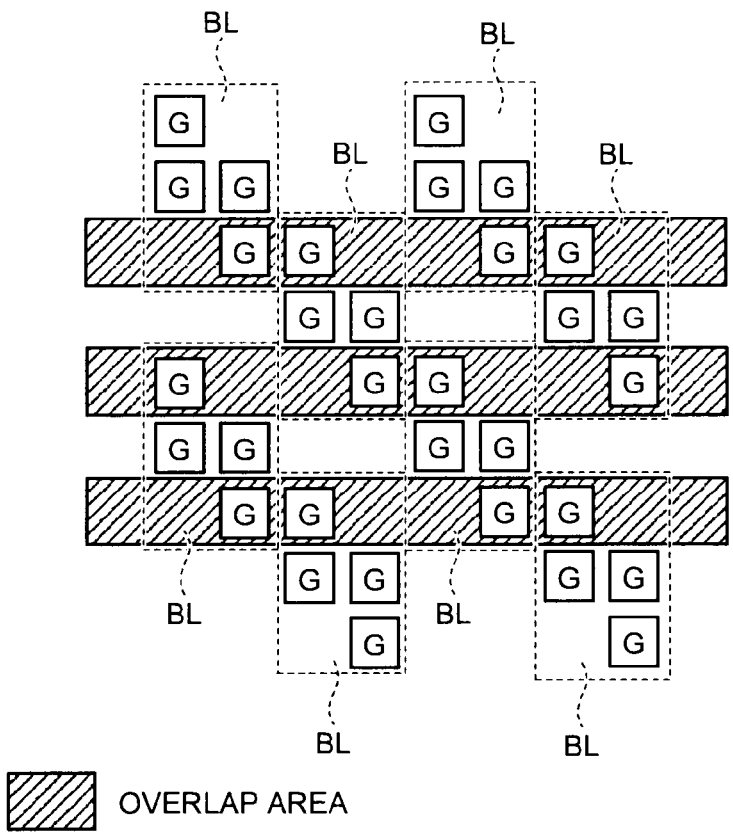
FIGS. 4A and 4B are diagrams illustrating line noise in the Bayer array and the filter array of the present embodiment.
Figure 4B:
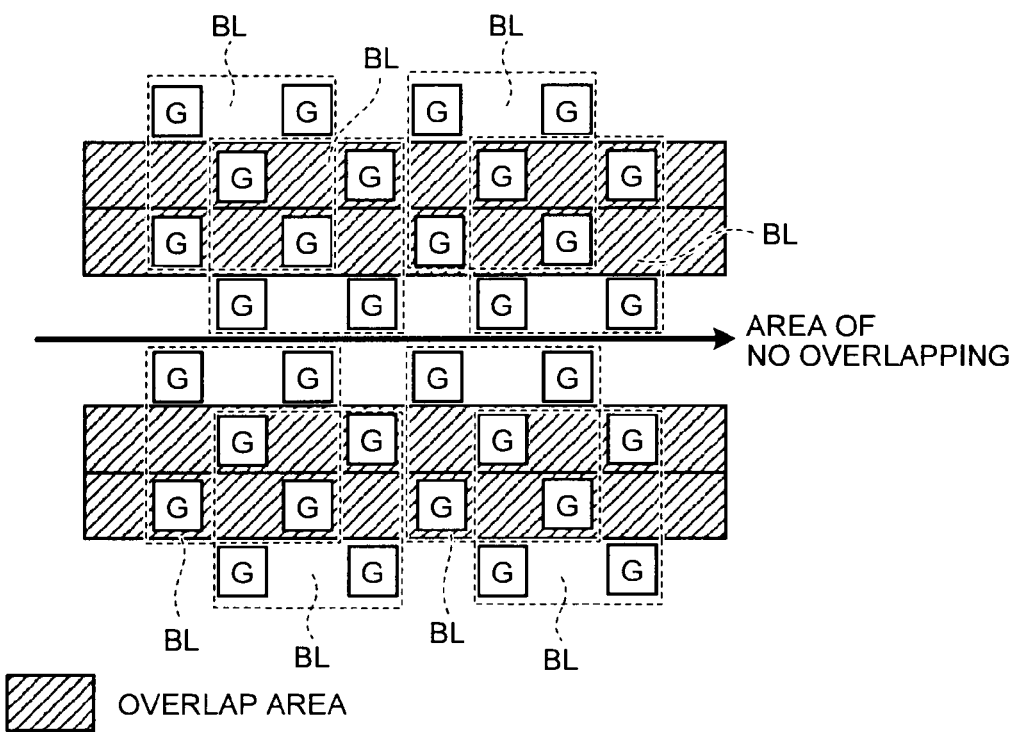

FIGS. 4A and 4B show diagrams illustrating line noise in the Bayer array and the filter array of the present embodiment, in which FIG. 4A shows a case of the filter array of the present embodiment and FIG. 4B shows a case of the Bayer array. In FIGS. 4A and 4B, G pixels are representatively illustrated and a shaded portion indicates an overlap area. The unit block in which addition processing is performed is denoted as BL.

FIGS. 4A and 4B show the configuration of pixels configured after four pixels of the same color being added. As shown in FIG. 4A, the filter array of the present embodiment is arranged to be shifted in the column direction by one pixel. Since 4-pixel addition processing is performed in units of BL, pixels of the same color overlap by one pixel in the row direction in the pixels configured after four pixels being added. Therefore, noise is dispersed upward and downward in the column direction and line noise is reduced. By contrast, in the case of the Bayer array as shown in FIG. 4B, columns without such overlaps are generated periodically resulting in that line noise of columns without overlaps becomes conspicuous.

According to the solid-state imaging device of the present embodiment, as described above, in a color filter array in which two blocks of two pixels in the row direction×two pixels in the column direction of G pixels are arranged on one diagonal line, and a block of two pixels in the row direction× two pixels in the column direction of R pixels and a block of two pixels in the row direction×two pixels in the column direction of B pixels are arranged on the other diagonal line, the pixels are shifted by one pixel in the column direction alternately in the row direction so that two pixels of the same color are arranged in the column direction and two pixels of the same color on adjacent rows arranged in the column direction are shifted by one pixel. As a result, line noise can be reduced and also a highly sensitive image in high resolution can be obtained.

The color filter array of the present embodiment is not limited to the example illustrated in FIG. 2 and the arrangement of R, G, and B may be modified. An effect of the present embodiment can be achieved by an arrangement in which two pixels of the same color are arranged in the column direction and two pixels of the same color on adjacent rows arranged in the column direction are shifted by one pixel.

Figure 5:
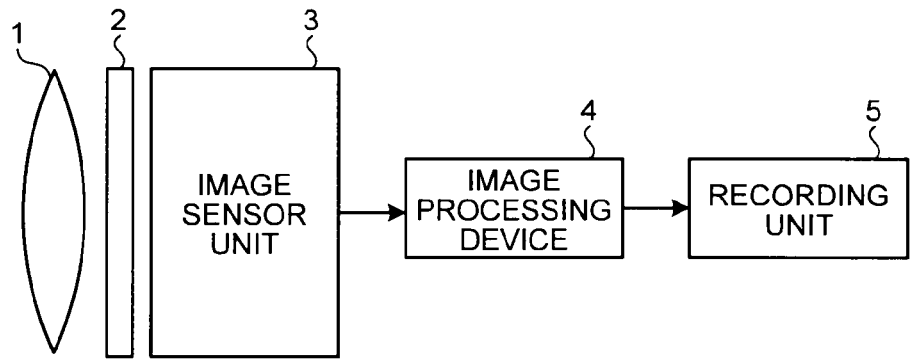
FIG. 5 is a block diagram showing one example of the configuration of an image recording apparatus in which a solid-state imaging device of the present embodiment is mounted.

FIG. 5 is a block diagram showing one example of the configuration of an image recording apparatus in which a solid-state imaging device of the present embodiment is mounted. As shown in FIG. 5, the image recording apparatus includes an imaging lens 1, an IR cut filter 2, an image sensor unit 3 to which a solid-state imaging device of the present embodiment is applied, an image processing device 4, and a recording unit 5. While the image sensor unit 3 and the image processing device 4 are provided separately herein, the image sensor unit 3 may be configured to include the image processing device 4.

In FIG. 5, the imaging lens 1 serves as an optical system to collects light from an object and forms an image of the object in the image sensor unit 3. The IR cut filter 2 removes infrared light from the light collected by the imaging lens 1. The image sensor unit 3 captures an image of the object by converting the light collected by the imaging lens 1 into signal charges and outputs as an image signal to the image processing device 4.

More specifically, the image sensor unit 3 generates an analog image signal by taking pixels values of R, G, and B in the order corresponding to the color filter array and sequentially amplifies the analog image signal by the gain in accordance with imaging conditions. Further, the image sensor unit 3 converts the obtained image signal from an analog form into a digital form.

The image processing device 4 performs various kinds of processing on the digital image signal input from the image sensor unit 3 and outputs the processed digital image signal to the recording unit 5. The recording unit 5 records the image signal input from the image processing device 4 in a memory or a recording medium.

Figure 6:
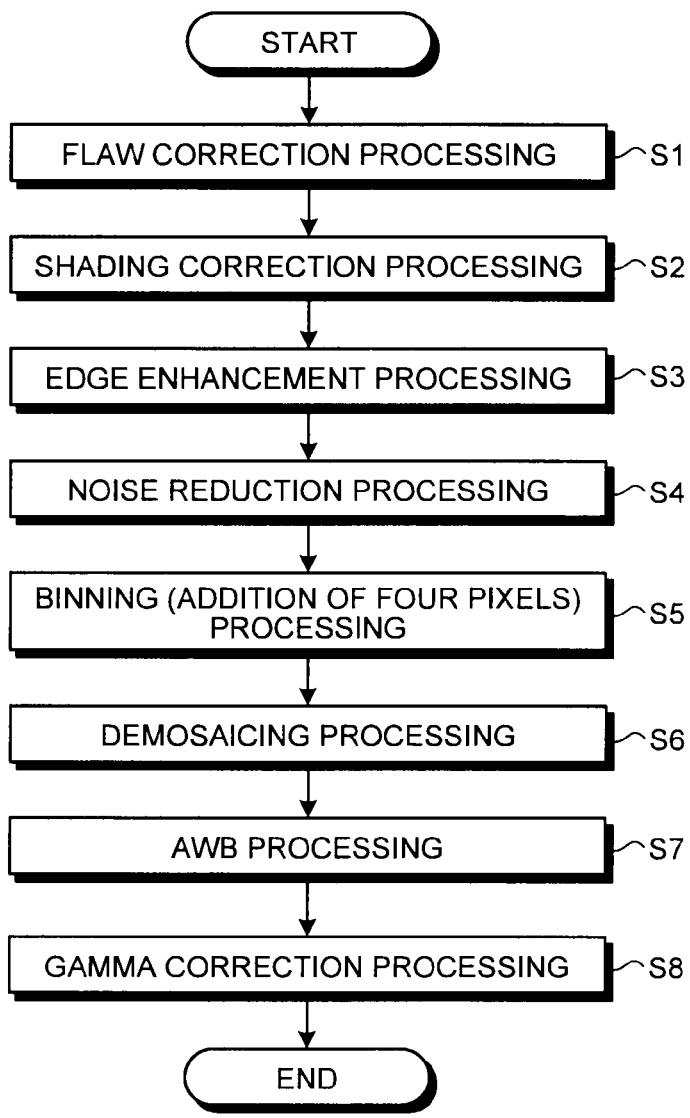
FIG. 6 is a flowchart showing the flow of signal processing by an image processing device.

FIG. 6 is a flowchart showing one example of the flow of signal processing by the image processing device 4. The image processing device 4 includes a processing unit to perform binning processing (addition of four adjacent pixels of the same color). In FIG. 6, first in step S1, a correction is made to make missing pixels inconspicuous to prevent image degradation due to pixel defects generated when the image sensor is manufactured (flaw correction processing).

In step S2, luminance unevenness caused by a difference in light quantity between the center and periphery caused by the imaging lens 1 is corrected (shading correction processing). In step S3, edge enhancement processing is performed using correction coefficients calculated based on the imaging conditions of the image sensor unit 3 and the position of each pixel.

In step S4, noise such as fixed pattern noise, dark current noise, and short noise is removed (noise reduction processing). In step S5, binning processing of adding four adjacent pixels of the same color is performed. When the size of an output image is a predetermined size, the binning processing is performed if the output image is output in a ¼ size (½ both vertically and horizontally) with respect to the number of effective pixels, for example. The binning processing is also performed if the processing is determined to be necessary as a result of determining whether to perform the binning processing based on various conditions. For example, since the analog gain increases when illuminance is low, and the binning processing is performed if the gain value exceeds a predetermined value.

In step S6, image interpolation processing (demosaicing processing) is performed on the digital image signal transmitted in the order of the color filter array. In the demosaicing, the sensitivity level value of any insufficient color component is generated by interpolation processing of an image signal obtained by capturing an object image.

In step S7, the white balance of the image is automatically adjusted (Automatic White Balance control: AWB). In step S8, the color saturation and brightness of an image displayed on a display or the like are corrected by gamma correction processing. The procedure of the series of processing described in the present embodiment is only an example and other processing may be added, processing that can be omitted may be omitted, or the order may be changed if appropriate.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device having color pixels in which color filters are arranged for respective pixels, wherein
in a color filter array in which two blocks of two pixels in a row direction×two pixels in a column direction of an X1 color are arranged on one diagonal line, and a block of two pixels in the row direction×two pixels in the column direction of an X2 color and a block of two pixels in the row direction×two pixels in the column direction of an X3 color are arranged on the other diagonal line, the pixels are shifted by one pixel in the column direction alternately in the row direction so that two pixels of a same color are arranged in the column direction and two pixels of the same color on adjacent rows arranged in the column direction are shifted by one pixel.

2. The solid-state imaging device according to claim 1, wherein pixels configured after addition of four pixels overlap by one pixel with pixels of the same color in the row direction.

3. The solid-state imaging device according to claim 1, wherein the X1 color is green, the X2 color is red, and the X3 color is blue.

4. A color filter arrangement method for a solid state imaging device having color pixels in which color filters are arranged for respective pixels, wherein
   in a color filter array in which two blocks of two pixels in a row direction×two pixels in a column direction of an X1 color are arranged on one diagonal line, and a block of two pixels in the row direction×two pixels in the column direction of an X2 color and a block of two pixels in the row direction×two pixels in the column direction of an X3 color are arranged on the other diagonal line,
   the pixels are shifted by one pixel in the column direction alternately in the row direction so that two pixels of a same color are arranged in the column direction and two pixels of the same color on adjacent rows arranged in the column direction are shifted by one pixel.

5. The color filter arrangement method for a solid state imaging device according to claim 4, wherein pixels configured after addition of four pixels overlap by one pixel with pixels of the same color in the row direction.

6. The color filter arrangement method for a solid state imaging device according to claim 4, wherein the X1 color is green, the X2 color is red, and the X3 color is blue.

7. An image recording apparatus comprising: a solid-state imaging device having color pixels in which color filters are arranged for respective pixels; and an image processing device, wherein
   in the solid-state imaging device:
   in a color filter array in which two blocks of two pixels in a row direction×two pixels in a column direction of an X1 color are arranged on one diagonal line, and a block of two pixels in the row direction×two pixels in the column direction of an X2 color and a block of two pixels in the row direction×two pixels in the column direction of an X3 color are arranged on the other diagonal line,
   the pixels are shifted by one pixel in the column direction alternately in the row direction so that two pixels of a same color are arranged in the column direction and two pixels of the same color on adjacent rows arranged in the column direction are shifted by one pixel, and
   the image processing device includes:
   a processing unit that adds four adjacent pixels of a same color to an image signal output from the solid-state imaging device.

8. The image recording apparatus according to claim 7, wherein pixels configured after addition of four pixels overlap by one pixel with pixels of the same color in the row direction.

9. The image recording apparatus according to claim 7, wherein the X1 color is green, the X2 color is red, and the X3 color is blue.

* * * * *